(12) United States Patent
Huang

(10) Patent No.: US 8,922,722 B2
(45) Date of Patent: Dec. 30, 2014

(54) PROJECTION APPARATUS FOR PROVIDING MULTIPLE VIEWING ANGLE IMAGES

(75) Inventor: Junejei Huang, Taoyuan-Hsien (TW)

(73) Assignee: Delta Electronics, Inc. (TW)

( * ) Notice: Subject to any disclaimer, the term of this patent is extended or adjusted under 35 U.S.C. 154(b) by 98 days.

(21) Appl. No.: 13/587,083

(22) Filed: Aug. 16, 2012

(65) Prior Publication Data

US 2013/0321718 A1  Dec. 5, 2013

(30) Foreign Application Priority Data

May 29, 2012 (TW) .............................. 101119033 A

(51) Int. Cl.
*G02F 1/1335* (2006.01)

(52) U.S. Cl.
USPC ......... 349/5; 349/8; 349/13; 353/20; 356/326

(58) Field of Classification Search
CPC ................................. G02B 27/28; G02B 5/30
USPC ........................ 349/5, 8, 13; 353/20; 356/326
See application file for complete search history.

(56) References Cited

U.S. PATENT DOCUMENTS

| | | | | |
|---|---|---|---|---|
| 4,653,867 A * | 3/1987 | Urabe et al. | ..................... | 349/22 |
| 7,982,828 B2 | 7/2011 | Yamanaka | | |
| 2004/0066492 A1 | 4/2004 | Nakashima et al. | | |
| 2005/0035314 A1 | 2/2005 | Yamaguchi | | |
| 2008/0192152 A1 | 8/2008 | Facius et al. | | |

FOREIGN PATENT DOCUMENTS

| | | |
|---|---|---|
| CN | 1412599 A | 4/2003 |
| TW | 471640 | 1/2002 |
| TW | I352216 | 12/2011 |

OTHER PUBLICATIONS

John R. Moore et al., "Time-multiplexed color autostereoscopic display", Computer Laboratory, University of Cambridge and Department of Engineering, University of Cambridge, SPIE Symposium on Stereoscopic Displays and Applications VII, San Jose, California, Jan. 28-Feb. 2, 1996, vol. 2653.

* cited by examiner

*Primary Examiner* — Lucy Chien
(74) *Attorney, Agent, or Firm* — Cantor Colburn LLP

(57) ABSTRACT

A projection apparatus for providing multiple viewing angle images is disclosed. The projection apparatus includes a light source module, a polarizing light splitting element, a first and a second reflective light valve and a light combining element. The polarizing light splitting element has a light incident surface, a first light exiting surface and a second light exiting surface. The light incident surface optically couples with the light source module, while the first and the second light exiting surfaces optically couple with the first and the second reflective light valves respectively. The light combining element optically couples to the reflective light valves. Further, the light source module sequentially provides a first light beam and a second light beam. The light beams are transferred via the polarizing light splitting element, the reflective light valves and the light combining element to provide at least four viewing angle images to the viewers.

24 Claims, 17 Drawing Sheets

| Image position | 671A, 671B | 681A, 681B | Light source module |
|---|---|---|---|
| 1 | 1,1 | 0,0 | 61B |
| 2 | 0,0 | 0,0 | 61B |
| 3 | 0,0 | 0,0 | 61A |
| 4 | 1,1 | 0,0 | 61A |
| 5 | 1,1 | 1,1 | 61B |
| 6 | 0,0 | 1,1 | 61B |
| 7 | 0,0 | 1,1 | 61A |
| 8 | 1,1 | 1,1 | 61A |
| 9 | 0,0 | 1,1 | 61B |
| 10 | 1,1 | 1,1 | 61B |
| 11 | 1,1 | 1,1 | 61A |
| 12 | 0,0 | 1,1 | 61A |
| 13 | 0,0 | 0,0 | 61B |
| 14 | 1,1 | 0,0 | 61B |
| 15 | 1,1 | 0,0 | 61A |
| 16 | 0,0 | 0,0 | 61A |

FIG. 8

PROJECTION APPARATUS FOR PROVIDING MULTIPLE VIEWING ANGLE IMAGES

CROSS-REFERENCES TO RELATED APPLICATIONS

This application claims priority to Taiwan Patent Application No. 101119033 filed on May 29, 2012, which are hereby incorporated herein by reference in its entirety.

BACKGROUND OF THE INVENTION

1. Field of the Invention

The present invention provides a projection apparatus, and more particularly, to a projection apparatus for providing multiple viewing angle images.

2. Descriptions of the Related Art

To obtain more vivid and realistic images, corresponding displaying technologies have been developed in succession over recent years to satisfy the viewers' demands. In contrast to early-stage flat panel displays which mainly focus on the improvement of the resolution and colors, the three-dimensional (3D) display apparatuses that have appeared over recent years aim to provide the viewers with a vivid stereoscopic displaying effect.

The stereoscopic displaying effect is achieved primarily by feeding different viewing angle images of an object to the left and the right eyes respectively. According to the vision characteristics of human eyes, when the left and the right eyes receive two images with the same image contents but different parallaxes simultaneously, a 3D image of the object with a sense of level and depth will be perceived by the viewer.

In practice, 3D images are generally viewed either by using glasses or with the naked eye; technical developments over recent years have focused on the latter. Furthermore, when being viewed with the naked eye, the images could be viewed in a time multiplex mode or a spatial multiplex mode. Generally, spatial multiplex mode uses large panel display (LCD or plasma display) that is covered with a directional screen (lenticular type or barrier type.) The multiple pixels on the large panel display are guided by the directional screen to different partitioned zones at an observing plane. From any one of the observing positions, only one of multiple pixels on the panel can be observed.

FIG. 1 is a schematic view of a conventional projection-type stereoscopic display apparatus 1 adopting the time multiplex mode. As shown, the stereoscopic display apparatus comprises a plurality of strip-like light sources 11 disposed adjacent to each other, a Fresnel lens 12 and a liquid crystal display (LCD) panel 13. The strip-like light sources 11 each provide a light beam to the Fresnel lens 12 time-sequentially. The light beam is imaged by the Fresnel lens 12 onto the corresponding viewing zone.

FIG. 2 is a schematic view of another conventional projection-type stereoscopic display apparatus 2 adopting the time multiplex mode. As shown, the display apparatus 2 comprises a light source 21, a polarizer 23, a rotary polygonal mirror 25, a panel 27 and a plurality of optical components 29. The light source 21 generates a light beam that is polarized by the polarizer 23 and then reflected by the rotary polygonal mirror 25 onto the panel 27 for imaging, which produces a scanning-like effect. Then, the optical components 29 project the images of different viewing angles to different viewing zones according to a time sequence. More specifically, the light source 21 generates a first view angle image, a second view angle image, a third view angle image and a fourth view angle image on adjacent viewing zones of the panel 27 in different time sequences. However, this projection-type stereoscopic display apparatus requires the use of a rotary polygonal mirror 25 to realize the above said results. In addition, the rotary polygonal mirror 25 mostly functions in a mechanical way, so considerable noises are produced due to friction. Moreover, with the increasing demand for improved resolution, more viewing angles shall be provided, and thereby, the rotation speed of the rotary polygonal mirror 25 must be increased, which makes the aforesaid shortcoming more prominent.

Therefore, there are still shortcomings and problems to be overcome either in the spatial multiplex mode or the time multiplex mode. Accordingly, it is highly desirable in the art to provide a stereoscopic display apparatus with advantages such as a higher light utilization factor, no mechanical operating elements, low costs, simplified optical configurations and a high resolution without the above said shortcomings and problems.

SUMMARY OF THE INVENTION

An objective of the present invention is to provide a projection apparatus capable of providing multiple view angle images that has increased light utilization efficiency, a reduced cost, a compact component arrangement and a high resolution and that eliminates the need of a mechanical rotary member.

To achieve the aforesaid objective, the present invention provides a projection apparatus for providing multiple view angle images, which comprises a light source module, a polarizing light splitting element, a first reflective light valve, a second reflective light valve and a light combining element. The first reflective light valve and the second reflective light valve are disposed at the side of the polarizing light splitting element.

The polarizing light splitting element further has a light incident surface, a first light exiting surface and a second light exiting surface. The light incident surface of the polarizing light splitting element optically couples with the light source module, while the first light exiting surface and the second light exiting surface of the polarizing light splitting element optically couple with the first reflective light valve and the second reflective light valve respectively. The light combining element is optically coupled with the first and the second reflective light valves respectively. With these arrangements, the light source module can sequentially provide a first light beam and a second light beam which has a light path different from a light path of the first light beam. Then the first light beam and the second light beam that are converted are provided to the viewer via the polarizing light splitting element, the first reflective light valve, the second reflective light valve and the light combining element.

In detail, when the first light beam provided by the light source module enters into the polarizing light splitting element, the polarizing light splitting element is used to split or divide the first light beam into a first polarized light beam and a second polarized light beam. Then, the first polarized light beam and the second polarized light beam are optically coupled with the first reflective light valve and the second reflective light valve respectively. Then, the first reflective light valve is used to reflect the first polarized light beam, and the second reflective light valve is used to reflect the second polarized light beam.

Similarly, when the second light beam provided by the light source module enters into the polarizing light splitting element, the polarizing light splitting element is also used to split or divide the second light beam into a third polarized light beam and a fourth polarized light beam. The third polarized light beam and the fourth polarized light beam are optically coupled with the first reflective light valve and the second reflective light valve respectively. Then, the first reflective light valve is used to reflect the third polarized light beam, and the second reflective light valve is used to reflect the fourth polarized light beam.

The first polarized light beam and the third polarized light beam are light beams in the first polarized direction. The second polarized light beam and the fourth polarized light beam are light beams in the second polarized direction.

Finally, the first polarized light beam and the third polarized light beam would be reflected by the light combining element respectively, and the second polarized light beam and the fourth polarized light beam would pass through the light combining element respectively. Thereby, four viewing angle images can be seen by the user.

With the aforesaid arrangements, the user(s) can see multiple viewing angle images. Thereby, a projection apparatus capable of providing multiple viewing angle images that has increased light utilization efficiency, a reduced cost, a compact component arrangement, a high resolution and eliminates the need of a mechanical rotary member can be provided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 8 is a schematic view illustrating the corresponding relationships between the imaging positions of the projection apparatus of FIG. 7 and statuses of the first transmission valve, the second transmission valve, a third transmission valve, a fourth transmission valve and the light source module;

DESCRIPTION OF THE PREFERRED EMBODIMENT

In the following descriptions, the present invention will be explained with reference to embodiments thereof. The present invention provides a projection apparatus for providing multiple viewing angle images. It shall be appreciated that in the following embodiments and the attached drawings, the description of these embodiments is only for the purpose of illustration rather than limitation. Meanwhile, in the following embodiments and the attached drawings, the elements that are not directly related to the present invention are omitted from depiction; and the dimensional relationships among and the numbers of individual elements in the attached drawings are illustrated only for the ease of understanding but not to limit the actual scale, sizes and numbers.

The present invention provides a projection apparatus for providing multiple viewing angle images, which at least comprises a light source module, a polarizing light splitting element, a first reflective light valve, a second reflective light valve and a light combining element. The first reflective light valve and the second reflective light valve are disposed on the side of the polarizing light splitting element.

Furthermore, the phrase "optically couple" that is used below generally refers to the propagation of light beams between the optical elements; that is, if two optical elements are optically coupled with each other, then it means that a light beam from one of the optical elements can propagate to the other of the optical elements.

Figure 1:
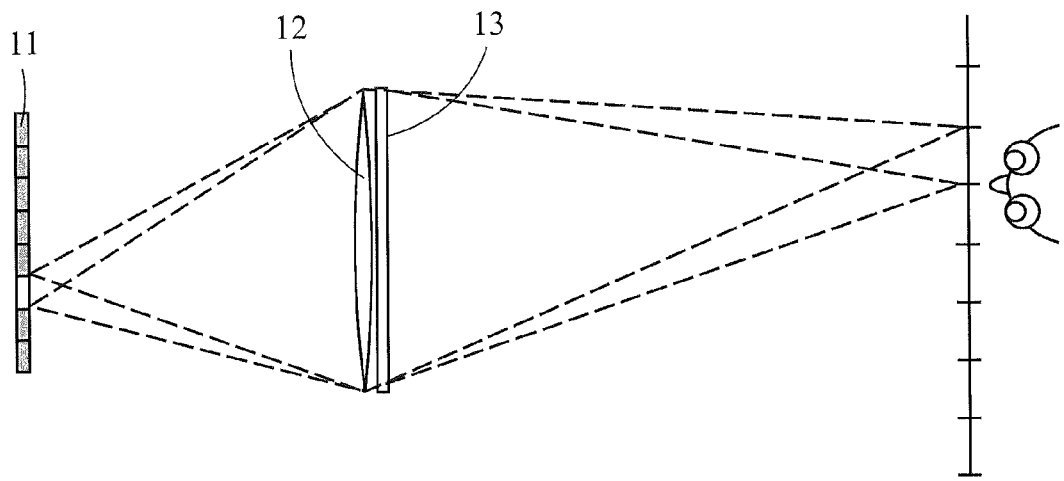
FIG. 1 is a schematic view of a conventional projection-type stereoscopic display apparatus adopting the time multiplex mode.
Figure 2:
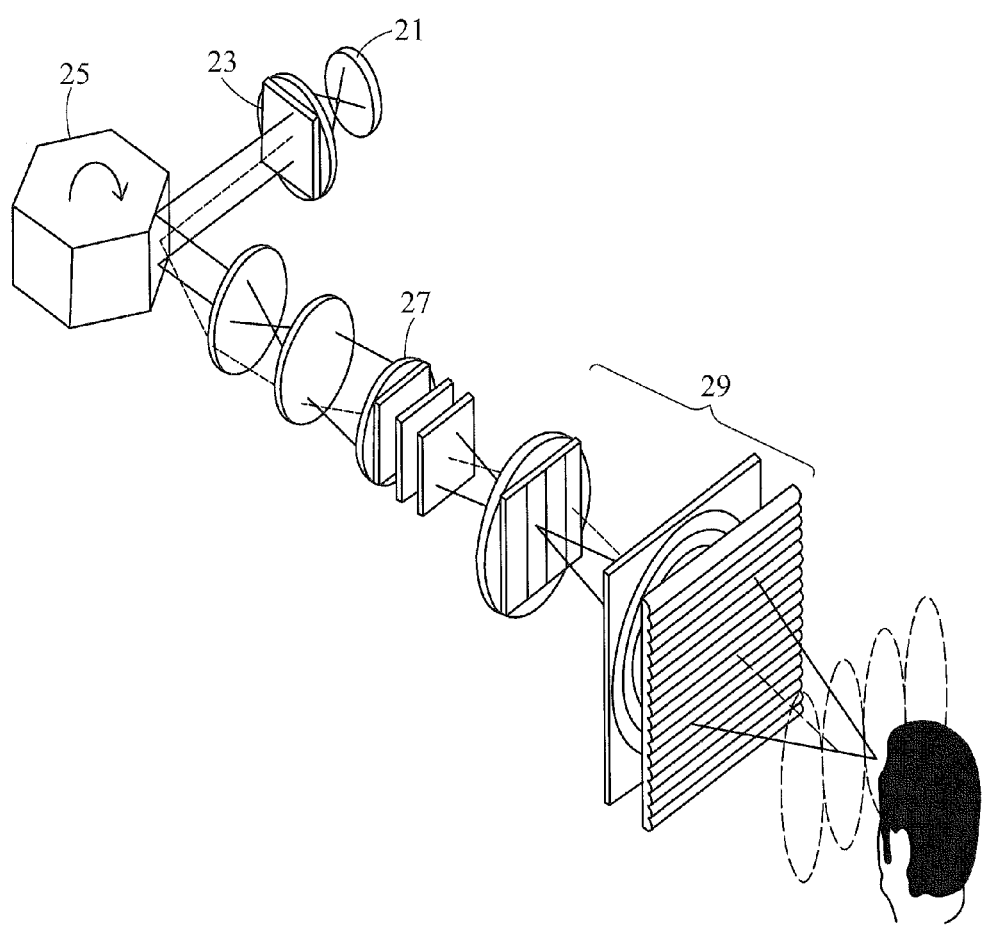
FIG. 2 is a schematic view of another conventional projection-type stereoscopic display apparatus adopting the time multiplex mode.
Figure 3A:
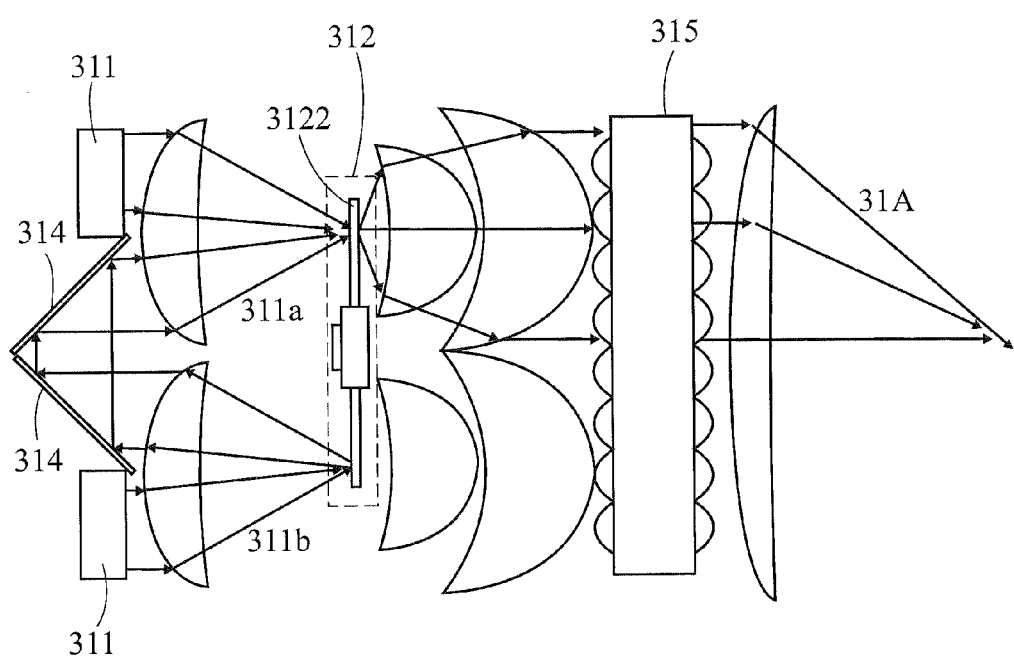
FIG. 3A is a schematic view illustrating a light path of a light source module of a projection apparatus according to the present invention in the first time sequence.
Figure 3B:
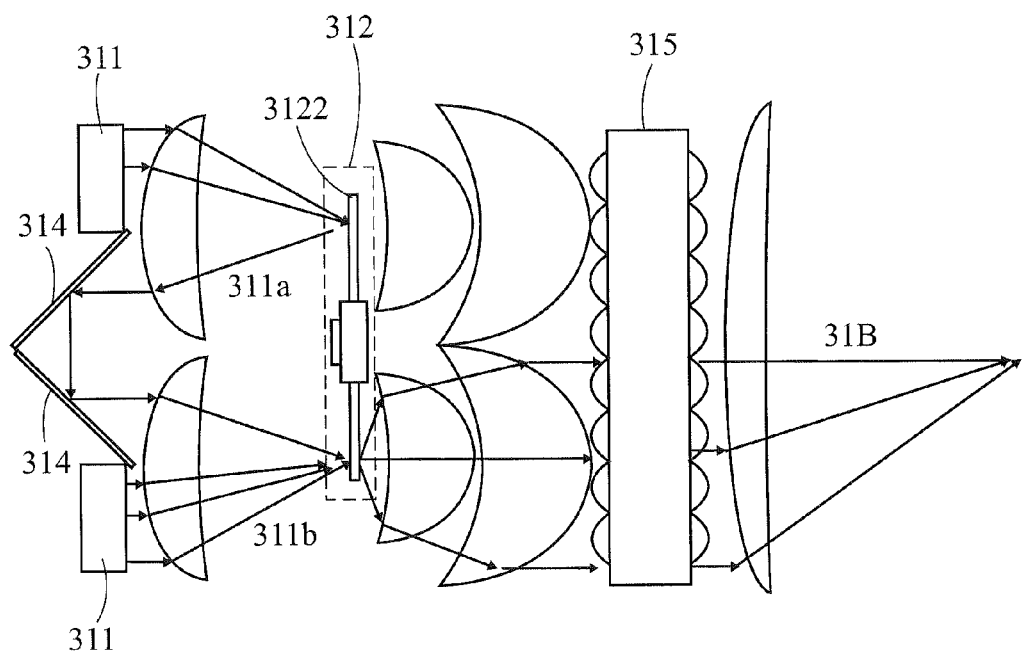
FIG. 3B is a schematic view illustrating a light path of the light source module of the projection apparatus according to the present invention in the second time sequence.
Figure 4:
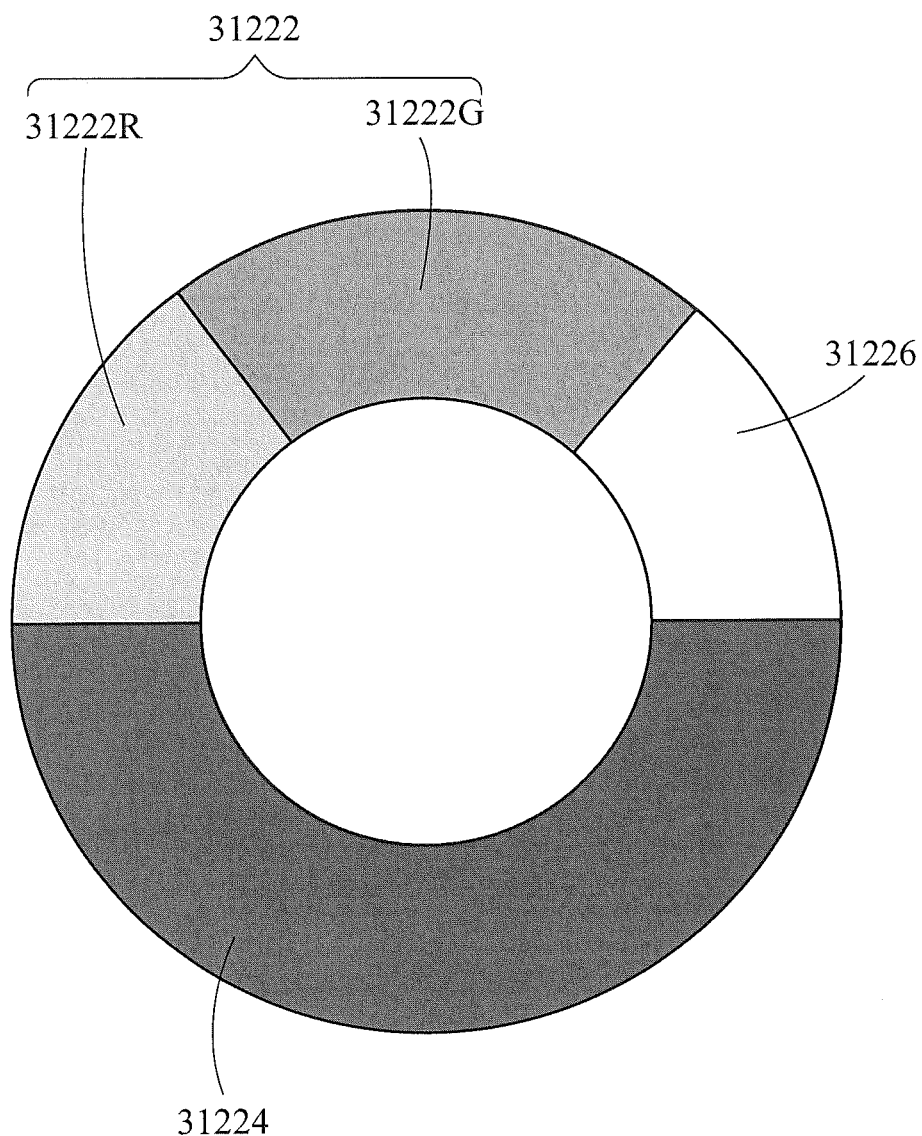
FIG. 4 is a front view of a rotary wheel of the light source module shown in FIG. 3A and FIG. 3B.

Hereinbelow, an embodiment of a light source module that could be used in the projection apparatus of the present invention will be described firstly. First, with reference to FIGS. 3A, 3B and 4 together, FIGS. 3A and 3B are schematic views illustrating the light paths of the light source module of the projection apparatus according to the present invention in the first time and second time sequence respectively. FIG. 4 is a front view of the rotary wheel of the light source module of FIG. 3A and FIG. 3B.

The light source module 31 of the projection apparatus of the present invention may comprise two laser light sources 311, a color wheel module 312, a light coupling element 314 and a light homogenizing element 315. To clearly show relative positions of the elements, internal members (e.g., a motor, a detector, etc.) other than the rotary wheel 3122 of the color wheel module 312 are omitted. The two laser light sources 311 may each be a blue laser. In this embodiment, the light coupling element 314 are two reflectors, each of which has a reflective surface, and the two reflective surfaces form an included angle therebetween. Furthermore, the light coupling element 314 may also be a reflective prism in other embodiments; and similarly, the reflective prism in other embodiments also has at least two reflective surfaces, and two of the at least two reflective surfaces could form an included angle therebetween. In this embodiment, the light homogenizing element 315 may be a lens array, a fly lens, an integration rod, a light tunnel or the like.

In detail, the rotatable rotary wheel 3122 of the color wheel module 312 has a first side and a second side opposite to the first side. The two laser light sources 311 and the light coupling element 314 are disposed at a side (the first side of the rotary wheel 3122) of the color wheel module 312. The two laser light sources 311 are disposed adjacent to each other, and the light coupling element 314 is disposed between the two laser light sources 311. The light coupling element 314 of this embodiment are two reflectors, and the reflective surfaces of the two reflectors may further include an angle therebetween which is preferably 90°. The light homogenizing element 315 is disposed on the other side (the second side of the rotary wheel 3122) of the color wheel module 312.

With reference to FIG. 4, the rotary wheel 3122 has at least one waveband converting region 31222, a transmissive region 31226 and a reflective region 31224. The at least one waveband converting region 31222 is used to convert a waveband of the light beams, the transmissive region 31226 is used to allow the light beams to pass therethrough, and the reflective region 31224 is used to reflect the light beams. In this embodiment, the waveband converting region 31222 are two waveband converting regions 31222R, 31222G; the transmissive region 31226 is a transparent region; and the surface of the reflective region 31224 is made of mirror. The waveband converting regions 31222 and the transmissive region 31226 account for one half of the rotary wheel 3122 while the reflective region 31224 accounts for the other half of the rotary wheel 3122 so that the section of the waveband converting regions 31222 and the transmissive region 31226 and the section of the reflective region 31224 are respectively rotatable to correspond to the two laser light sources 311. The waveband converting regions 31222 are adapted to convert the waveband of the converged light beams thereon. Furthermore, the two waveband converting regions 31222R, 31222G are a red light converting region and a green light converting region respectively, and the laser light sources 311 are each a blue laser light source.

In practical operations, the waveband converting region 31222R allows the light beams to be converted into a first waveband thereon and then to pass therethrough. In this embodiment, the waveband converting region 31222R allows a light beam of a red light waveband to pass therethrough. Similarly, the waveband converting region 31222G allows the light beams to be converted into a second waveband thereon and then to pass therethrough. In other words, the waveband converting region 31222G allows the light beam of a green light waveband to pass therethrough. The transmissive region 31226 is adapted to transmit the light beams directly without converting the waveband of the light beams. The reflective region 31224 is adapted to reflect all the converged light beams thereon so that the light beams cannot pass through the rotary wheel 3122.

It shall be additionally appreciated that the rotary wheel 3122 of the color wheel module 312 is a transmissive phosphor wheel in this embodiment. In other words, each of the waveband converting regions 31222R, 31222G further comprises a transparent plate (not shown), a phosphor material is disposed or coated on the transparent plate (not shown), and two reflective sheets (not shown) disposed at the first side and the second side of the waveband converting region 31222R, 31222G respectively. Using the waveband converting region 31222R as an example, the phosphor material can excite the converged light beams thereon into a light beam of the first waveband (a light beam of the red light waveband); and a part of the excited light beam exits directly from the second side of the rotary wheel 3122 while the other part of the excited light beam is further reflected by the corresponding reflective sheet to exit from the second side of the rotary wheel 3122. The purpose of the two reflective sheets is that the light beam that is excited incompletely can be reflected by the reflective sheet disposed at the second side of the rotary wheel 3122 to exit from the first side of the rotary wheel 3122. In the other hand, the light beam that is excited completely may exit directly from the second side or may be reflected by the reflective sheet disposed at the first side to exit from the second side. In brief, these arrangements allow only the light beam of the first waveband to pass through the waveband converting region 31222R, 31222G.

Furthermore, this embodiment may further have another implementation, which adopts a reflective waveband converting region. In such an implementation, other optical elements must be adjusted correspondingly, but the effect of the reflective waveband converting region is similar to that of the color wheel module of this embodiment. In other embodiments, the waveband converting region 31222 could include three waveband converting regions: in addition to the red light converting region and the green light converting region illustrated in this embodiment, a yellow light converting region is further included to convert the converged light beams thereon into a yellow light.

Hereinbelow, for ease of understanding and description, the operating process of the light source module 31 is divided into a first time sequence and a second time sequence. This division of the operating process is only for the convenience of description but not to limit the operating sequence. In practical operations, the light source module 31 switches between the first time sequence and the second time sequence alternately.

With reference to FIG. 3A again, in the first time sequence, the laser light sources 311 each generate a light beam 311a, 311b. With the two lenses disposed between the laser light sources 311 and the color wheel module 312, the light beam 311a is converged onto the waveband converting regions 31222 or the transmissive region 31226 of the rotary wheel 3122, while the light beam 311b is converged onto the reflective region 31224 of the rotary wheel 3122 (see FIG. 4)

For example, the light beam 311a is converted by the waveband converting region 31222R into a light beam of the first waveband, which then exits from the second side of the rotary wheel 3122. Meanwhile, the light beam 311b is reflected by the reflective region 31224 of the rotary wheel 3122 into the light coupling element 314, which then optically couples (transfers) the light beam 311b to the waveband converting region 31222R. Similarly, the light beam 311b is converted by the waveband converting region 31222R into a light beam of the first waveband, which then exits from the second side of the rotary wheel 3122. Next, the light beam 311a and the light beam 311b of the first waveband are transferred by the two lenses to the light homogenizing element 315. Then, the light beams 311a, 311b are received and homogenized by the light homogenizing element 315 into a first light beam 31A (which is now a red light.)

If the light beam 311a is converged onto the transmissive region 31226 of the rotary wheel 3122 and the light beam 311b is converged onto the reflective region 31224 of the rotary wheel 3122 in the first time sequence, then the light beam 311a can pass through the transmissive region 31226 directly. In other words, the transmissive region 31226 doe not affect waveband conversion effect on the light beam 311a, so the light beam 311a in this embodiment would be still remains as a blue light. In this case, the light beam 311b is reflected by the reflective region 31224 of the rotary wheel 3122 into the light coupling element 314, which then optically couples (transfers) the light beam 311b to the transmissive region 31226. The light beam 311b also would pass through the transmissive region 31226 directly, and is homogenized by the light homogenizing element 315 into the first light beam 31A (which is now a blue light.)

The operating mode in which the light beams 311a, 311b are optically coupled to and converted by the waveband converting region 31222G is similar to the operating mode in which the light beams 311a, 311b are optically coupled to and converted by the waveband converting region 31222R, and thus, will not be further described herein.

In brief, in the first time sequence, the transmissive region 31226 or the waveband converting region 31222R or 31222G of the rotary wheel 3122 may be rotated to a position corresponding to the light beam 311a. The reflective region 31224 of the rotary wheel 3122 may be rotated to a position corresponding to the light beam 311b. Depending on which one of the waveband converting regions 31222R and 31222G and the transmissive region 31226 corresponds to the light beam 311a, the first light beam 31A may be a red light, a green light or a blue light.

FIG. 3B illustrates a schematic view of the light path of the light source module 31 in the second time sequence. At this point, the reflective region 31224 of the rotary wheel 3122 is rotated to the position corresponding to the light beam 311a, and the light beam 311b corresponds to the waveband converting regions 31222 or the transmissive region 31226. In other words, unlike the first time sequence, the light beam 311a is now converged onto the reflective region 31224 of the rotary wheel 3122 and the light beam 311b is converged onto the waveband converting regions 31222 or the transmissive region 31226 of the rotary wheel 3122.

Then, when the light beam 311b is converged onto the waveband converting region 31222R of the rotary wheel 3122, the light beam 311b is converted into the first waveband and passes through the rotary wheel 3122. Meanwhile, the light beam 311a is reflected by the reflective region 31224 of the rotary wheel 3122 into the light coupling element 314, which optically couples (transfers) the light beam 311b to the waveband converting region 31222R. Similarly, the light beam 311a is converted into the first waveband and passes through the rotary wheel 3122. Finally, the light beams 311a, 311b of the first waveband are transferred by the two lenses to the light homogenizing element 315. The light beams 311a, 311b are received and homogenized by the light homogenizing element 315 into a second light beam 31B (which is now a red light).

If the light beam 311b is converged to the transmissive region 31226 of the rotary wheel 3122 and the light beam 311a is converged to the reflective region 31224 of the rotary wheel 3122 in the second time sequence, then the light beam 311b can pass through the transmissive region 31226 directly. In other words, the transmissive region 31226 has no waveband conversion effect on the light beam 311b, and the light beam 311b in this embodiment remains still as a blue light. In this case, the light beam 311a is reflected by the reflective region 31224 of the rotary wheel 3122 into the light coupling element 314, which then optically couples (transfers) the light beam 311a to the transmissive region 31226. Then, the light beam 311a passes through the transmissive region 31226 directly, and is homogenized by the light homogenizing element 315 into the first light beam 31A (which is now a blue light).

Furthermore, the operating mode in which the light beams 311a, 311b are optically coupled to and converted by the waveband converting region 31222G is similar to the operating mode in which the light beams 311a, 311b are optically coupled to and converted by the waveband converting region 31222R, and thus, will not be further described herein.

In brief, in the second time sequence, the second light beam 31B provided by the light source module 31 may be a red light, a green light or a blue light. Accordingly, with the aforesaid arrangement, the first light beam 31A and the second light beam 31B which propagate along different light paths are provided by the light source module 31 in different time sequences.

Figure 5A:
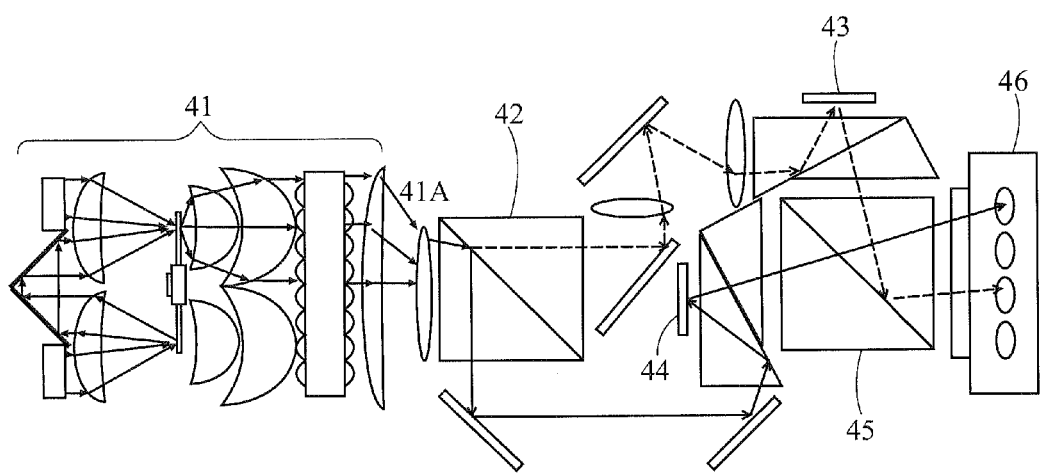
FIG. 5A is a schematic view illustrating the first embodiment of the projection apparatus of the present invention in the first time sequence.
Figure 5B:
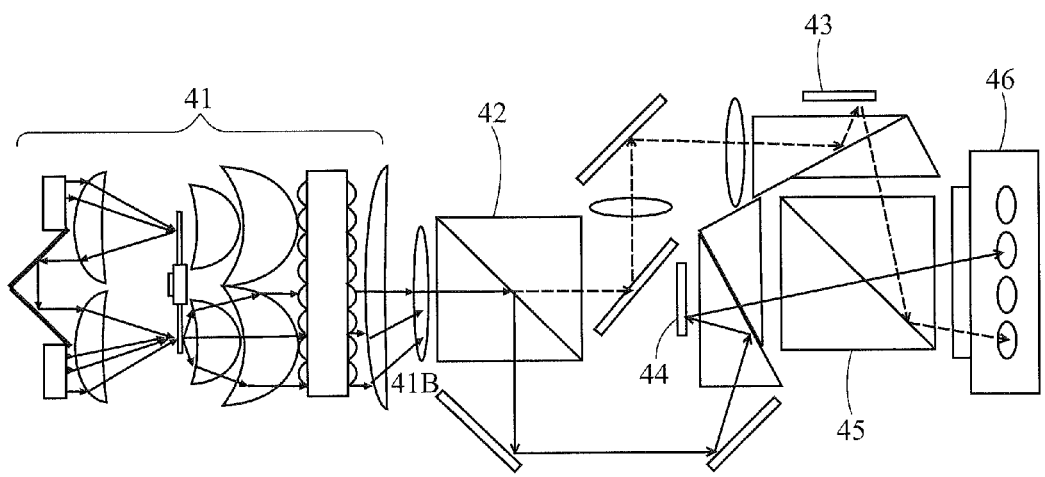
FIG. 5B is a schematic view illustrating the first embodiment of the projection apparatus of the present invention in the second time sequence.

FIGS. 5A and 5B illustrate schematic views of the first embodiment of the projection apparatus of the present invention in the first time sequence and the second time sequence respectively. The projection apparatus 4 comprises a light source module 41, a polarizing light splitting element 42, a first reflective light valve 43, a second reflective light valve 44, a light combining element 45 and a projection lens 46. The polarizing light splitting element 42 is disposed on a side of the light source module 41, and has a light incident surface (not shown), a first light exiting surface (not shown) and a second light exiting surface (not shown) which optically couple with the light source module 41, the first reflective light valve 43 and the second reflective light valve 44 respectively. The light combining element 45 transfers an incident light beam to the projection lens 46, and optically couples with the first reflective light valve 43 and the second reflective light valve 44. Furthermore, the projection lens 46 optically couples with a first light exiting surface (not shown) of the light combining element 45.

In detail, in this embodiment, the projection apparatus 4 further comprises two reflecting mirrors, two lenses and a total internal reflection cube that are disposed between the first light exiting surface of the polarizing light splitting element 42 and the first reflective light valve 43. With this arrangement, the light beam exiting from the first light exiting surface of the polarizing light splitting element 42 can propagate to the first reflective light valve 43. Moreover, another two reflecting mirrors and a total internal reflection cube are disposed between the second light exiting surface of the polarizing light splitting element 42 and the second reflective light valve 44 so that the light beam exiting from the second light exiting surface of the polarizing light splitting element 42 can propagate to the second reflective light valve 44.

Furthermore, the light source module 41 may be the aforesaid light source module 31 or some other equivalent member, and the polarizing light splitting element 42 is a polarizing beam splitter. The first reflective light valve 43 and the second reflective light valve 44 may each be a digital micromirror device or a silicon-based liquid crystal device. The light combining element 45 is a total internal reflection cube.

With continued reference to FIG. 5A, in the first time sequence, the light source module 41 provides a first light beam 41A, which enters into the polarizing light splitting element 42 from the light incident surface of the polarizing light splitting element 42 and is split or divide by the polarizing light splitting element 42 into a first polarized light beam and a second polarized light beam. In this case, the first polarized light beam is in a first polarized direction (shown by the dashed lines), and the second polarized light beam is in a second polarized direction (shown by the solid lines). Furthermore, for the convenience of understanding, the light beams in different polarized directions are depicted by using different lines.

Then, the first polarized light beam exits from the first light exiting surface of the polarizing light splitting element 42, and is optically coupled to the first reflective light valve 43. Then, the first polarized light beam is reflected by the first reflective light valve 43 into the light combining element 45, and is reflected by the light combining element 45 to the projection lens 46 so that a first viewing angle image can be seen by the viewer. Meanwhile, the second polarized light beam exits from the second light exiting surface of the polarizing light splitting element 42, and is optically coupled to the second reflective light valve 44. Then, the second polarized light beam is reflected by the second reflective light valve 44 into the light combining element 45, and then passes through the light combining element 45 to the projection lens 46 so that a second viewing angle image can be seen by the viewer.

It shall be appreciated that in this embodiment, the light beam with the first polarized direction is a P polarized light that passes through the polarizing coating of the polarizing light splitting element 42, and the light beam with the second polarized direction is an S polarized light that is reflected by the polarizing coating of the polarizing light splitting element 42.

Similarly, with continued reference to FIG. 5B, in the second time sequence, the light source module 41 provides a second light beam 41B, which enters into the polarizing light splitting element 42 from the light incident surface of the polarizing light splitting element 42 and is split by the polarizing light splitting element 42 into a third polarized light beam and a fourth polarized light beam. In this case, the third polarized light beam is in the first polarized direction (shown by the dashed lines), and the fourth polarized light beam is in the second polarized direction (shown by the solid lines).

Then, the third polarized light beam exits from the first light exiting surface of the polarizing light splitting element 42, and is optically coupled to the first reflective light valve 43. Then, the third polarized light beam is reflected by the first reflective light valve 43 into the light combining element 45, and is reflected by the light combining element 45 to the projection lens 46 so that a third viewing angle image can be seen by the viewer. Meanwhile, the fourth polarized light beam exits from the second light exiting surface of the polarizing light splitting element 42, and is optically coupled to the second reflective light valve 44. Then, the fourth polarized light beam is reflected by the second reflective light valve 44 into the light combining element 45, and then passes through the light combining element 45 to the projection lens 46 so that a fourth viewing angle image can be seen by the viewer.

In brief, in the first time sequence, the viewer can receive two images of different viewing angles from the projection lens 46. In the second time sequence, the viewer can receive another two images of different viewing angles from the projection lens 46. Through the alternate operations between the first time sequence and the second time sequence, at least four different viewing angle images can be provided for the viewer.

Figure 6A:
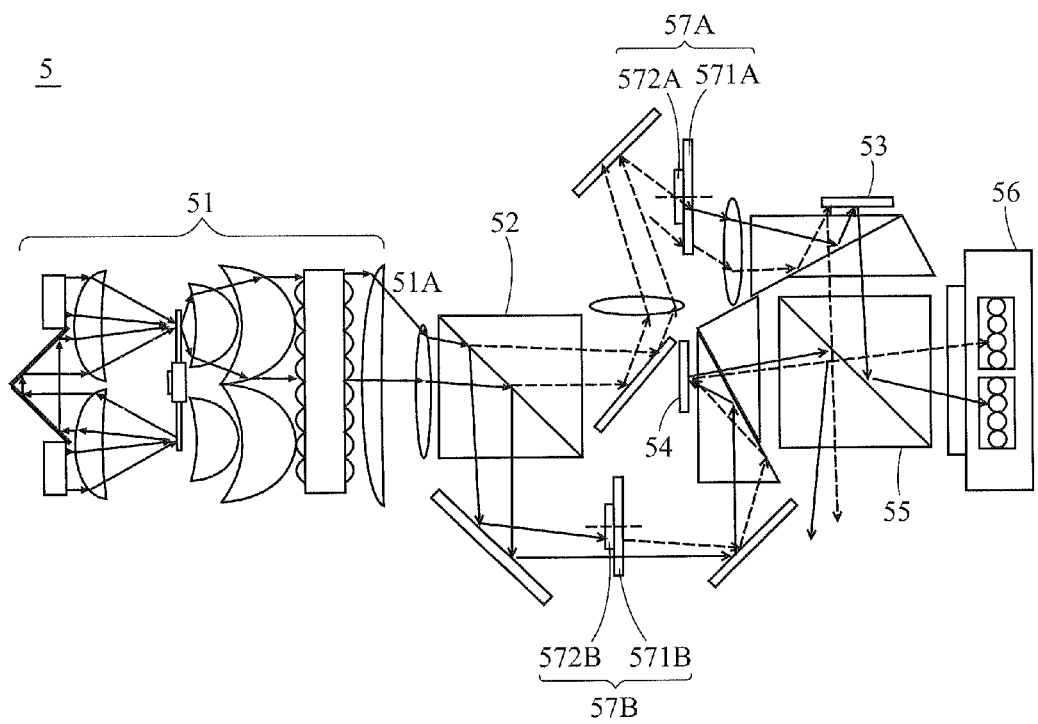
FIG. 6A is a schematic view illustrating the second embodiment of the projection apparatus of the present invention in the first time sequence and when the first transmission valve and second transmission valve are in an OFF status.
Figure 6B:
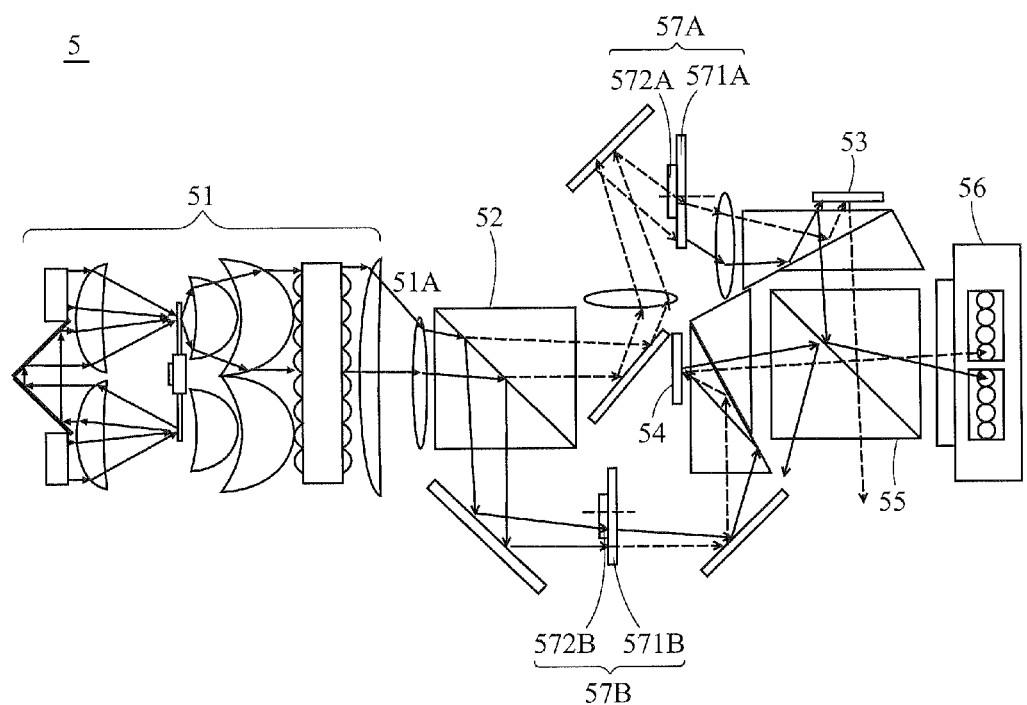
FIG. 6B is a schematic view illustrating the second embodiment of the projection apparatus of the present invention in the first time sequence and when the first transmission valve and the second transmission valve are in an ON status.
Figure 6C:
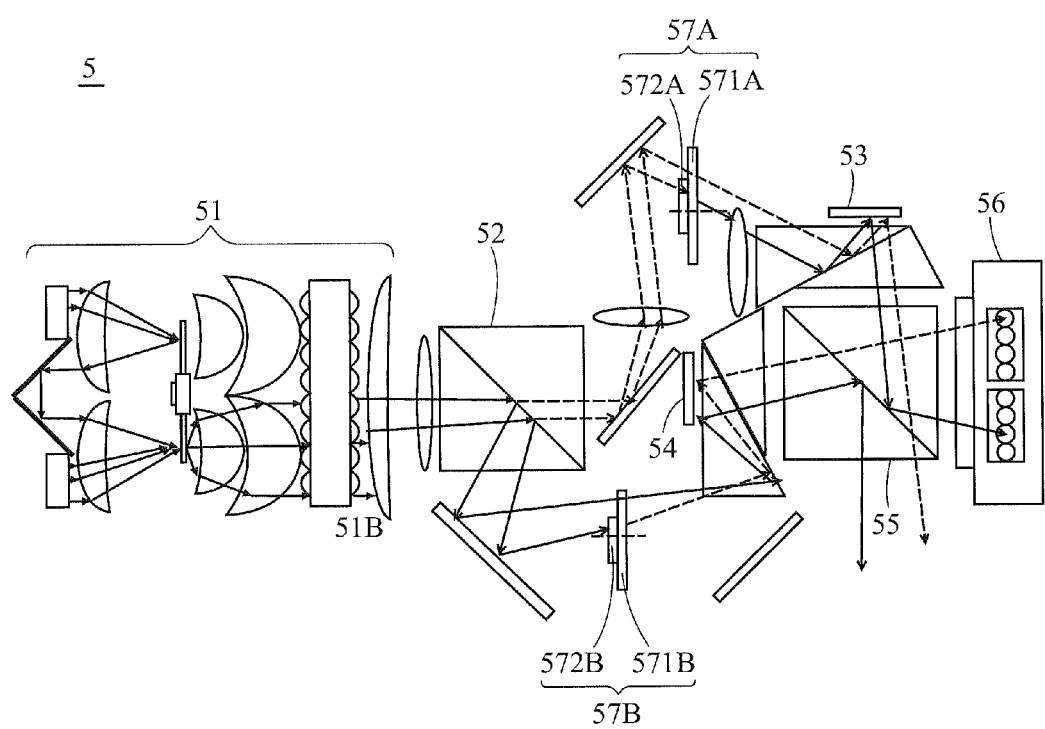
FIG. 6C is a schematic view illustrating the second embodiment of the projection apparatus of the present invention in the second time sequence and when the first transmission valve and the second transmission valve are in the OFF status.
Figure 6D:
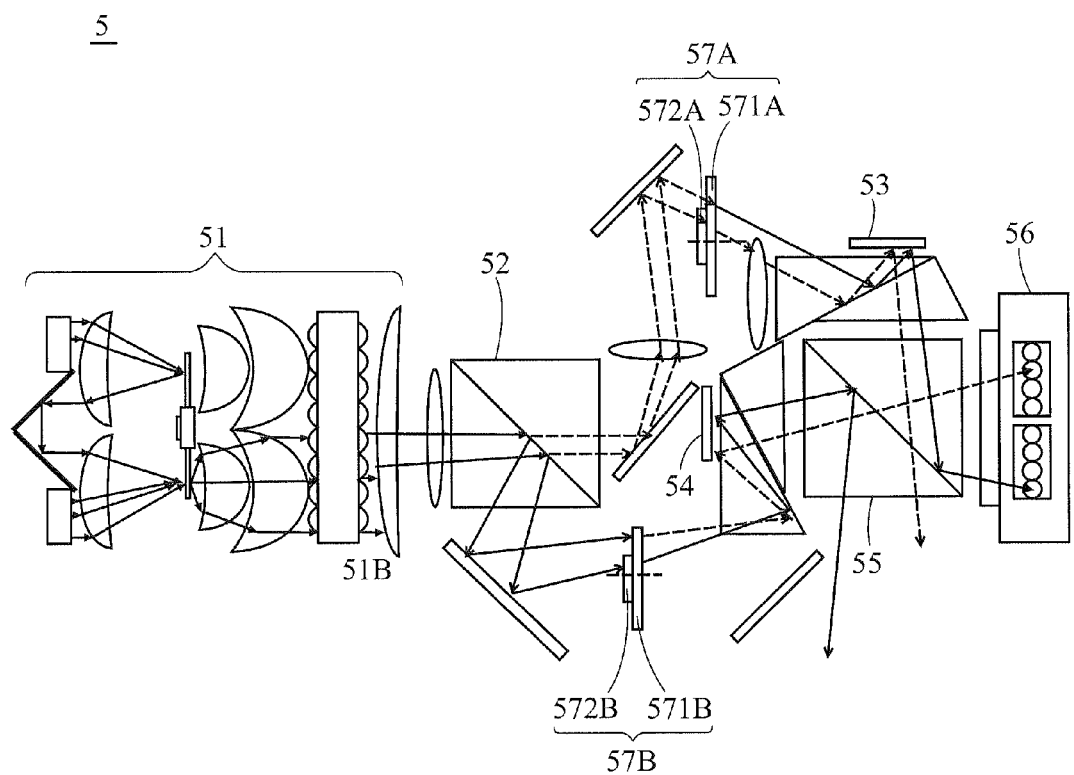
FIG. 6D is a schematic view illustrating the second embodiment of the projection apparatus of the present invention in the second time sequence and when the first transmission valve and the second transmission valve are in the ON status.

Next, with reference to FIGS. 6A to 6D together, FIG. 6A and FIG. 6B illustrate the second embodiment of the projection apparatus of the present invention in the first time sequence. Specifically, FIG. 6A is a schematic view when the first transmission valve and second transmission valve are in the OFF status; and FIG. 6B is a schematic view when the first transmission valve and the second transmission valve are in the ON status. FIG. 6C and FIG. 6D illustrate the second embodiment of the projection apparatus of the present invention in the second time sequence. Specifically, FIG. 6C is a schematic view when the first transmission valve and the second transmission valve are in the OFF status; and FIG. 6D is a schematic view when the first transmission valve and the second transmission valve are in the ON status.

Given above, the second embodiment of the projection apparatus 5 of the present invention comprises a light source module 51, a polarizing light splitting element 52, a first reflective light valve 53, a second reflective light valve 54, a light combining element 55 and a projection lens 56.

Furthermore, the second embodiment differs from the first embodiment in two respects: first, this embodiment further comprises a first transmissive light valve unit 57A and a second transmissive light valve unit 57B; and second, the light combining element 55 of this embodiment is a polarizing light combining element (e.g., a polarizing beam splitter).

The first transmissive light valve unit 57A is disposed between the first light exiting surface of the polarizing light splitting element 52 and the first reflective light valve 53, and the second transmissive light valve unit 57B is disposed between the second light exiting surface of the polarizing light splitting element 52 and the second reflective light valve 54. The polarizing light splitting element 52 and the light combining element 55 of this embodiment both allow a light beam in the first polarized direction to pass therethrough and reflect a light beam in the second polarized direction.

In detail, the first transmissive light valve unit 57A comprises a first transmission valve 571A and a half-wave plate 572A. The second transmissive light valve unit 57B comprises a second transmission valve 571B and a half-wave plate 572B. The half-wave plate 572A, 572B respectively disposed at a side of the first and the second transmission valve 571A, 571B. The first and the second transmission valve 571A, 571B can change the polarized direction of the light beam passing therethrough when being in the ON status, and allow the light beam to pass therethrough without performing any waveband conversion when being in the OFF status. The half-wave plates 572A, 572B is adapted to change the polarized direction of all the light beams passing therethrough.

The "ON status" described herein means that a voltage (which creates an electric field) is applied to the first/the second transmission valve 571A, 571B so that the arrangement status of molecules therein is changed corresponding to alter the polarized direction of the light beam passing therethrough. On the other hand, the "OFF status" described herein means that no voltage (no electric field) is applied to the first/the second transmission valve 571A, 571B (i.e., the polarized direction of the light beam passing therethrough is unchanged).

Furthermore, using the first transmissive light valve unit 57A of this embodiment as an example, The half-wave plate 572A is disposed (or attached) on the surface of the first transmission valve 571A, and an area of the surface of the first transmission valve 571A is twice as large as that of a surface of the half-wave plate 572A. Moreover, if the first transmission valve 571A is divided into an upper half and a lower half (illustrated by the dashed line), then only a half of the light beam passing through the upper half of the first transmissive light valve unit 57A will pass through the first transmission valve 571A while the other half of the light beam passing through the upper half of the first transmissive light valve unit 57A will sequentially pass through the half-wave plate 572A and the first transmission valve 571A (the lower half of the first transmission valve 571A).

The "upper half" and the "lower half" described herein only refer to different blocks of the first transmissive light valve unit 57A that operate corresponding to the first light beam 51A and the second light beam 51B. These definitions are only for the convenience of explanation but do not represent the necessary relationships between the light source module 51 and the first transmissive light valve unit 57A and, thus, are not intended to limit the present invention. The arrangement and the operation mode of the second transmissive light valve unit 57B are similar to those of the first transmissive light valve unit, and thus, will not be further described herein. The corresponding arrangement of and relationships among the other optical elements are similar to those of the first embodiment, and thus, will not be further described herein.

The first transmission valve 571A and the second transmission valve 571B of this embodiment may each be a liquid crystal display, a π-cell, a Ferro-electric liquid crystal (FLC), a Pockels cell, a Kerr shutter or a Faraday crystal.

According to the different statuses (the ON status and the OFF status) of the first transmissive light valve unit 57A and the second transmissive light valve unit 57B, the first time sequence and the second time sequence may further be each sub-divided into two stages where the first and the second transmission valves 571A, 571B are in the OFF status and in the ON status respectively.

Hereinbelow, the operating mode of the projection apparatus 5 of the present invention in the first time sequence and when the first and the second transmission valves 571A, 571B are in the OFF status will be described firstly.

First, with reference to FIG. 6A, the light source module 51 provides a first light beam 51A, which enters into the polarizing light splitting element 52 from the light incident surface of the polarizing light splitting element 52 and is split by the polarizing light splitting element 52 into a first polarized light beam and a second polarized light beam. In this case, the first polarized light beam is in the first polarized direction (shown by the dashed lines), and the second polarized light beam is in the second polarized direction (shown by the solid lines). Here, as described in the aforesaid embodiment, the light beams in different polarized directions are depicted by using different lines.

Then, the first polarized light beam exits from the first light exiting surface of the polarizing light splitting element 52 to propagate into the lower half of the first transmissive light valve unit 57A. A part of the first polarized light beam passes through the first transmission valve 571A of the first transmissive light valve unit 57A. The first transmission valve 571A is now in the OFF status, so it has no waveband conversion effect on the part of the first polarized light beam passing therethrough. In other words, the polarized direction of the first polarized light beam is still in the first polarized direction. Meanwhile, the other part of the first polarized light beam sequentially passes through the half-wave plate 572A and the first transmission valve 571A, and is converted by the half-wave plate 572A into the first polarized light beam with the second polarized direction (the first transmission valve 571A has no waveband conversion effect).

The first polarized light beam with the first polarized direction and the first polarized light beam with the second polarized direction are optically coupled to the first reflective light valve 53 respectively and reflected by the first reflective light valve 53 into the light combining element 55. Then, the first polarized light beam with the first polarized direction passes through the light combining element 55, and the first polarized light beam with the second polarized direction is reflected by the light combining element 55 to the projection lens 56 to be formed into the first viewing angle image.

Similarly, the second polarized light beam exits from the second light exiting surface of the polarizing light splitting element 52 to propagate into the lower half of the second transmissive light valve unit 57B. A part of the second polarized light beam passes through the second transmission valve 571B of the second transmissive light valve unit 57B. Because the second transmission valve 571B is now in the OFF status, this part of the second polarized light beam is unchanged in polarized direction and propagates to the second reflective light valve 54 directly. Meanwhile, the other part of the second polarized light beam sequentially passes through the half-wave plate 572B and the second transmission valve 571B, and is converted by the half-wave plate 572B into the second polarized light beam with the first polarized direction (the second transmission valve 571B has no waveband conversion effect).

The second polarized light beam with the first polarized direction and the second polarized light beam with the second polarized direction are optically coupled to the second reflective light valve 54 respectively and reflected by the second reflective light valve 54 into the light combining element 55 respectively. Then, the second polarized light beam with the first polarized direction passes through the light combining element 55 to the projection lens 56 to be formed into the second viewing angle image, and the second polarized light beam with the second polarized direction is reflected by the light combining element 55.

In brief, a first viewing angle image and a second viewing angle image can be formed in the first time sequence and when the first and the second transmission valves 571A, 571B are in the OFF status.

Next, the operating mode of the projection apparatus 5 of the present invention in the first time sequence and when the first and the second transmissive light valve units 57A, 57B are in the ON status will be described.

With reference to FIG. 6B, in this case, the first polarized light beam exits from the first light exiting surface of the polarizing light splitting element 52 and propagates into the lower half of the first transmission valve 571A of the first transmissive light valve unit 57A. Because the first transmission valve 571A is now in the ON status, a part of the first polarized light beam is converted into the first polarized light beam with the second polarized direction. The other part of the first polarized light beam passes through the half-wave plate 572A and the first transmission valve 571A sequentially, and is converted by the half-wave plate 572A into the first polarized light beam with the second polarized direction. The first polarized light beam with the second polarized direction is then converted by the first transmission valve 571A into the first polarized light beam with the first polarized direction. In other words, the polarized direction of the other part of the first polarized light beam is changed twice in this case. Similarly, the first polarized light beam with the first polarized direction passes through the light combining element 55, and the first polarized light beam with the second polarized direction is reflected by the light combining element 55 to the projection lens 56 to be formed into a fifth view angle image.

Meanwhile, the second polarized light beam exits from the second light exiting surface of the polarizing light splitting element 52 and propagates into the lower half of the second transmissive light valve unit 57B. A part of the second polarized light beam that passes through the second transmission valve 571B of the second transmissive light valve unit 57B is converted into the second polarized light beam with the first polarized direction. The other part of the second polarized light beam is converted by the half-wave plate 572B and the second transmission valve 571B respectively to be formed into the second polarized light beam with the second polarized direction. Then, the second polarized light beam with the first polarized direction passes through the light combining element 55 to be formed into the sixth viewing angle image. The second polarized light beam with the second polarized direction is reflected by the light combining element 55.

In brief, a fifth viewing angle image and a sixth viewing angle image can be formed in the first time sequence and when the first and the second transmissive light valve units 57A, 57B are in the ON status. By switching on or off the first and the second transmissive light valve units 57A, 57B in the first time sequence, four viewing angle images can be formed in the first time sequence.

Hereinbelow, the operating mode of the projection apparatus 5 of the present invention in the second time sequence and when the first and the second transmission valves 571A, 571B are in the OFF status will be described.

With reference to FIG. 6C the light source module 51 provides a second light beam 51B. The second light beam 51B enters into the polarizing light splitting element 52 from the light incident surface of the polarizing light splitting element 52 and is split by the polarizing light splitting element 52 into a third polarized light beam with the first polarized direction and fourth polarized light beam with the second polarized direction. After the third polarized light beam exits from the first light exiting surface of the polarizing light splitting element 52, a part of the third polarized light beam propagates into the upper half of the first transmission valve 571A, which is now in the OFF status, of the first transmissive light valve unit 57A. In other words, a part of the third polarized light beam that passes through the first transmission valve 571A will not be converted and remains still as the third polarized light beam with the first polarized direction. The other part of the third polarized light beam sequentially passes through the half-wave plate 572A and the first transmission valve 571A, and is converted by the half-wave plate 572A into the third polarized light beam with the second polarized direction. Also, the first transmission valve 571A has no waveband conversion effect on the third polarized light beam with the second polarized direction.

Then, the third polarized light beam with the first polarized direction and the third polarized light beam with the second polarized direction are optically coupled to the first reflective light valve 53 respectively and reflected by the first reflective light valve 53 into the light combining element 55. Then, the third polarized light beam with the first polarized direction passes through the light combining element 55, and the third polarized light beam with the second polarized direction is reflected by the light combining element 55 to the projection lens 56 to be formed into a third viewing angle image.

Similarly, the fourth polarized light beam exits from the second light exiting surface of the polarizing light splitting element 52 and propagates into the upper half of the second transmissive light valve unit 57B. A part of the fourth polarized light beam passes through the second transmission valve 571B of the second transmissive light valve unit 57B. Because the second transmission valve 571B is now in the OFF status, the fourth polarized light beam remains still in the second polarized direction and propagates to the second reflective light valve 54 directly. Meanwhile, the other part of the fourth polarized light beam sequentially passes through the half-wave plate 572B and the second transmission valve 571B, and is converted by the half-wave plate 572B into the fourth polarized light beam with the first polarized direction. Then, the fourth polarized light beam with the first polarized direction passes through the light combining element 55 to the projection lens 56 to be formed into the fourth viewing angle image, and the fourth polarized light beam with the second polarized direction is reflected by the light combining element 55.

In brief, a third viewing angle image and a fourth viewing angle image can be formed in the second time sequence and when the first and the second transmission valves 571A, 571B are in the OFF status.

Next, the operating mode of the projection apparatus 5 of the present invention in the second time sequence and when the first and the second transmissive light valve units 57A, 57B are in the ON status will be described.

With continued reference to FIG. 6D the third polarized light beam with the first polarized direction exits from the first light exiting surface of the polarizing light splitting element 52 and propagates into the upper half of the first transmission valve 571A of the first transmissive light valve unit 57A. Because the first transmission valve 571A is now in the ON status, a part of the third polarized light beam is converted into the third polarized light beam with the second polarized direction. The other part of the third polarized light beam passes through the half-wave plate 572A and the first transmission valve 571A sequentially, and is converted by the half-wave plate 572A into the third polarized light beam with the second polarized direction, which is then converted by the first transmission valve 571A into the third polarized light beam with the first polarized direction. In other words, the polarized direction of the other part of the third polarized light beam is changed twice in this case. Similarly, the third polarized light beam with the first polarized direction passes through the light combining element 55, and the third polarized light beam with the second polarized direction is reflected by the light combining element 55 to the projection lens 56 to be formed into a seventh viewing angle image.

Meanwhile, the fourth polarized light beam with the second polarized direction exits from the second light exiting surface of the polarizing light splitting element 52 and propagates into the upper half of the second transmissive light valve unit 57B. A part of the fourth polarized light beam that passes through the second transmission valve 571B of the second transmissive light valve unit 57B is converted into the fourth polarized light beam with the first polarized direction. The other part of the fourth polarized light beam is converted by the half-wave plate 572B and the second transmission valve 571B respectively to be formed into the fourth polarized light beam with the second polarized direction. Then, the fourth polarized light beam with the first polarized direction passes through the light combining element 55 to the projection lens 56 to be formed into an eighth viewing angle image. The fourth polarized light beam with the second polarized direction is reflected by the light combining element 55.

In other words, a seventh viewing angle image and an eighth viewing angle image can be formed in the second time sequence and when the first and the second transmission valves 571A, 571B are in the ON status. By switching on or off the first and the second transmissive light valve units 57A, 57B in the second time sequence, the four viewing angle images can be formed in the second time sequence.

Accordingly, the second embodiment of the projection apparatus 5 of the present invention is additionally provided with a first transmissive light valve unit 57A and a second transmissive light valve unit 57B, so eight viewing angle images can be formed by switching between the first time sequence and the second time sequence alternately.

Figure 7:
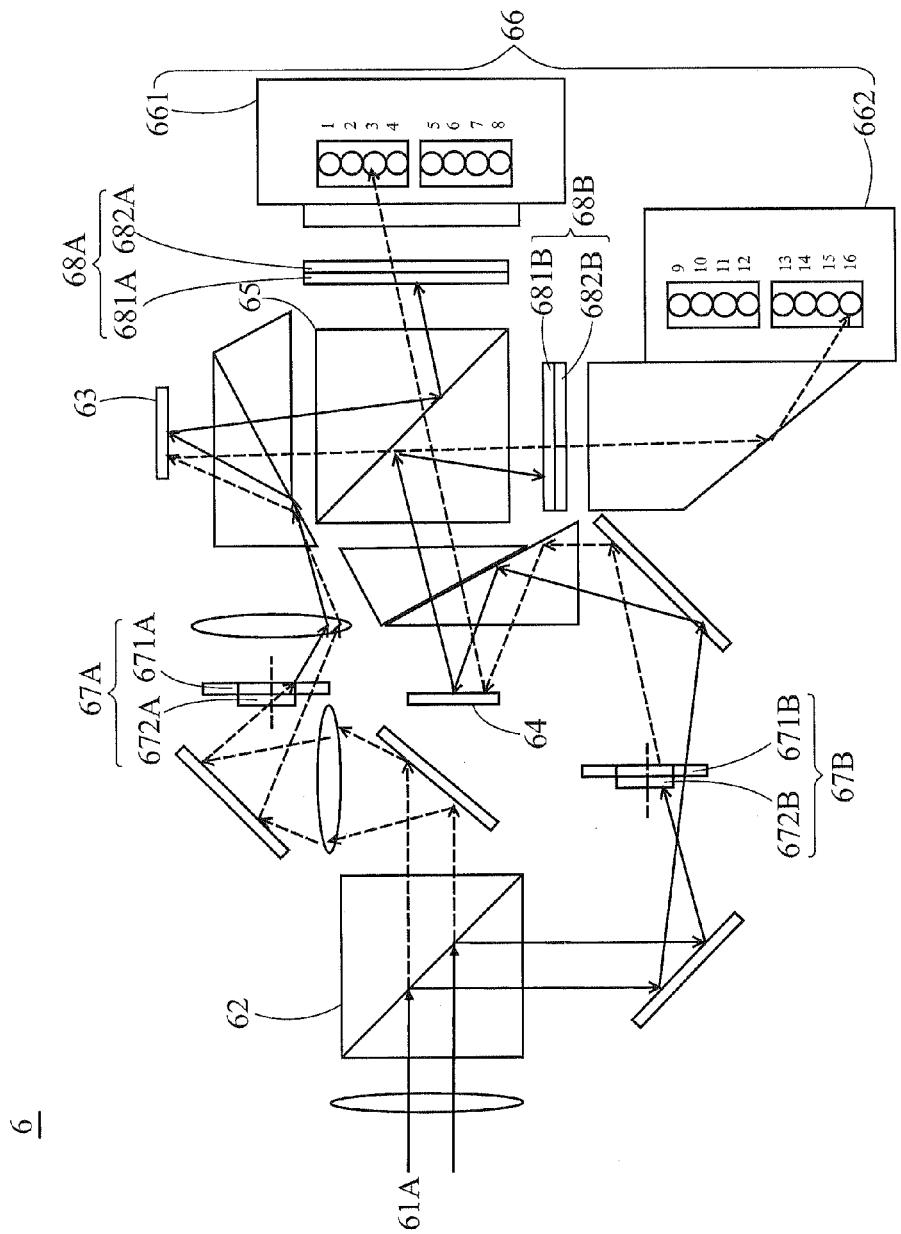
FIG. 7 is a schematic view illustrating a part of the third embodiment of the projection apparatus 6 according to the present invention.
Figure 9:
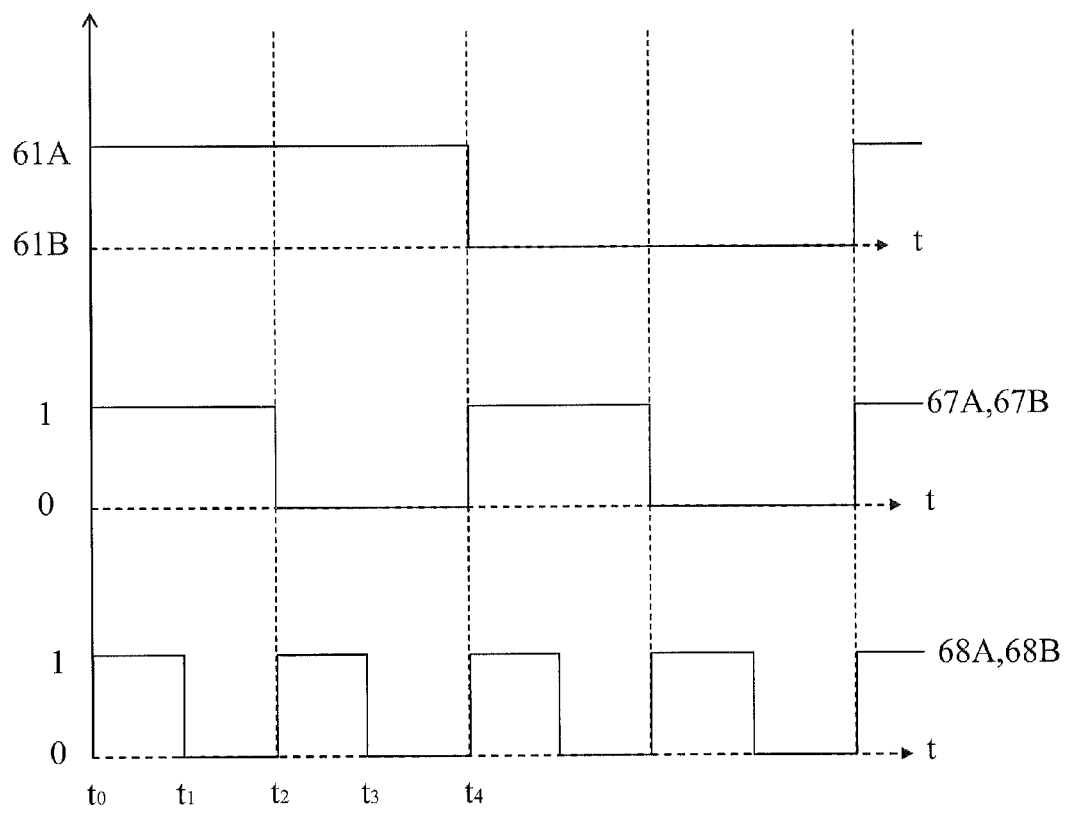
FIG. 9 is a diagram illustrating the corresponding operations of the rotary wheel of the light source module, the first and the second transmission valves, and the third and the fourth transmission valves of the projection apparatus of FIG. 7.

Next, with reference to FIGS. 7 to 9, FIG. 7 is a schematic view illustrating a part of the third embodiment of the projection apparatus 6 of the present invention; FIG. 8 is a schematic view illustrating the corresponding relationships between the image positions of the projection apparatus of FIG. 7 and statuses of the first transmission valve, the second transmission valve, a third transmission valve, a fourth transmission valve and the light source module; and FIG. 9 is a diagram illustrating the corresponding operations of the first and the second transmission valves, and the third and the fourth transmission valves of the projection apparatus of FIG. 7.

The third embodiment of the projection apparatus 6 of the present invention comprises a light source module (not shown), a polarizing light splitting element 62, a first reflective light valve 63, a second reflective light valve 64, a light combining element 65, a projection lens 66, a first transmissive light valve unit 67A and a second transmissive light valve unit 67B. Moreover, the projection lens 66 further comprises a first projection lens 661 and a second projection lens 662.

Compared to the second embodiment, this embodiment further comprises a third transmissive light valve unit 68A and a fourth transmissive light valve unit 68B, while the projection lens 66 further comprises a first projection lens 661 and a second projection lens 662. Moreover, each of the first transmissive light valve unit 67A and the second transmissive light valve unit 67B comprises four transmission valves 671A, 671B which are disposed adjacent to one another and two half-wave plates 672A, 672B.

The two half-wave plates 672A of the first transmissive light valve unit 67A are respectively disposed at the same side of two of the four first transmission valves 671A disposed adjacent to one another. Similarly, the two half-wave plates 672B of the second transmissive light valve unit 67B are also respectively disposed at the same side of two of the four second transmission valves 671B disposed adjacent to one another.

For example, the four first transmission valves 671A may be divided into two upper first transmission valves and two lower first transmission valves (the division is shown by the dashed line). One of the two half-wave plates 672A is attached on one of the two upper first transmission valves 671A, while the other of the two half-wave plates 672A is attached on one of the two lower first transmission valves 671A. The two upper first transmission valves 671A and the two lower first transmission valves 671A are disposed symmetrically with respect to the dashed line shown so that a similar optical coupling effect can be provided no matter whether the first light beam 61A or the second light beam 61B enters. In other words, the operating mode is similar for both the two upper first transmission valves 671A and the two lower first transmission valves 671A.

Furthermore, in this embodiment, the four transmission valves 671A, 671B, 681A, 681B operate synchronously, that is, the four transmission valves 671A, 671B, 681A, 681B are turned on or off simultaneously. Apart from this arrangement of this embodiment, an implementation is also possible where each of the first transmissive light valve units and the second transmissive light valve units only has four transmission valves that can be controlled separately or operate asynchronously. For example, only two of the four transmission valves are turned on at a first time point; and all of the four transmission valves are turned on at the second time point; and this can also achieve an effect similar to that of the first and the second transmissive light valve units of this embodiment or the second embodiment.

In addition to the first and the second transmissive light valve units 67A, 67B, this embodiment further comprises a third transmissive light valve unit 68A and a fourth transmissive light valve unit 68B. The third transmissive light valve unit 68A is disposed between the light combining element 65 and the first projection lens 661, and is optically coupled with the first light exiting surface of the light combining element 65 and the first projection lens 661. Similarly, the fourth transmissive light valve unit 68B is disposed between the light combining element 65 and the second projection lens 662, and is optically coupled with the second light exiting surface of the light combining element 65 and the second projection lens 662.

In detail, each of the third transmissive light valve unit 68A comprises a third transmission valve 681A and a filtering plate 682A. The fourth transmissive light valve unit 68B comprises a fourth transmission valve 681B and a filtering plate 682B. The filtering plate 682A, 682B respectively disposed at a side of the third and fourth transmission valve 681A, 681B. The first, the second, the third and the fourth transmission valves 671A, 671B, 681A, 681B can change the polarized direction of the light beam passing therethrough when being in the ON status, and allow the light beam to pass therethrough without converting the light beam when being in the OFF status. The filtering plates 682A, 682B only allow a light beam in the specific polarized direction to pass therethrough.

The first, second, third and fourth transmission valves 671A, 671B, 681A, 681B of this embodiment may each be a liquid crystal display, a π-cell, a Ferro-electric liquid crystal, a Pockels cell, a Kerr shutter or a Faraday crystal. The filtering plates 682A, 682B are each a filtering plate that allows a light beam in the first polarized direction (i.e., the P polarized light) to pass therethrough. The light combining element 65 is a polarizing light combining element (e.g., a polarizing beam splitter).

With continued reference to FIG. 7, the light source module of the projection apparatus 6 of the present invention is omitted from depiction for convenience of understanding, and the light source module of this embodiment may be the light source module 31, 41 or 51 of the aforesaid embodiments or some other equivalent device. The light source module can provide the first light beam 61A and the second light beam 61B (not shown) in different time sequences.

As an example, FIG. 7 shows that the light source module provides the first light beam 61A and the first, the second, the third and the fourth transmission valves 671A, 671B, 681A, 681B are in the OFF status. The first light beam 61A enters into the polarizing light splitting element 62 and is then split by the polarizing light splitting element 62 into a first polarized light beam with the first polarized direction and a second polarized light beam with the second polarized direction. Here, as described in the aforesaid embodiment, the light beams in different polarized directions are depicted by using different lines.

After the first polarized light beam exits from the first light exiting surface of the polarizing light splitting element 62, a part of the first polarized light beam propagates into one of the first transmission valves 671A of the first transmissive light valve unit 67A, which is now in the OFF status and has no waveband conversion effect on the part of the first polarized light beam passing therethrough. Meanwhile, the other part of the first polarized light beam sequentially passes through the half-wave plate 672A and another one of the first transmission valves 671A, and is converted by the half-wave plate 672A into the first polarized light beam with the second polarized direction.

Then, the first polarized light beam with the first polarized direction and the first polarized light beam with the second polarized direction are optically coupled to the first reflective light valve 63 and the light combining element 65. Then, the first polarized light beam with the first polarized direction exits from the second light exiting surface of the light combining element 65 to sequentially pass through the fourth transmission valve 681B and the filtering plate 682B (the fourth transmissive light valve unit 68B is now in the OFF status), and is finally formed into an image at an image position 16 of the second projection lens 662. The first polarized light beam with the second polarized direction is reflected by the light combining element 65 to sequentially pass through the third transmission valve 681A and the filtering plate 682A, and is blocked by the filtering plate 682A from entering into the first projection lens 661.

Similarly, after the second polarized light beam exits from the second light exiting surface of the polarizing light splitting element 62, a part of the second polarized light beam propagates into one of the second transmission valves 671B of the second transmissive light valve unit 67B, which is now in the OFF status and has no waveband conversion effect on the second polarized light beam passing therethrough. Meanwhile, the other part of the second polarized light beam sequentially passes through the half-wave plate 672B and another one of the second transmission valves 671B, and is converted by the half-wave plate 672B into the second polarized light beam with the first polarized direction.

Then, the second polarized light beam with the first polarized direction and the second polarized light beam with the second polarized direction are optically coupled to the second reflective light valve 64 and the light combining element 65. Then, the second polarized light beam with the first polarized direction exits from the first light exiting surface of the light combining element 65 to sequentially pass through the third transmission valve 681A and the filtering plate 682A (the third transmissive light valve unit 68A is now in the OFF status), and is finally formed into an image at an image position 3 of the first projection lens 661. The second polarized light beam with the second polarized direction is reflected by the light combining element 65 to sequentially pass through the fourth transmission valve 681B and the filtering plate 682B, and is blocked by the filtering plate 682B from entering into the second projection lens 662.

Although only the imaging at the image position 3 and the image position 16 is illustrated, imaging at other image positions can be readily known by those of ordinary skill in the art. Furthermore, the operations of other optical elements of this embodiment are similar to those of the aforesaid embodiments, and thus, will not be further described herein.

Next, with reference to FIGS. 8 and 9 together, FIG. 8 is a schematic view illustrating the image positions of the first, the second, the third and the fourth transmission valves 671A, 671B, 681A, 681B that correspond to different statuses of the light source module. If the statuses of the first and the second transmission valves 671A, 671B are (1, 1) in a certain time sequence, then the first transmission valve 671A is in the ON status, while the second transmission valve 671B is in the ON status. Similarly, if the statuses of the third and the fourth transmission valves 681A, 681B are (0, 0) in a certain time sequence, then the third transmission valve 681A is in the OFF status and the fourth transmission valve 681B is in the OFF status. For example, if the first and the second transmission valves 671A, 671B are both in the OFF status (0, 0) and the third and the fourth transmission valves 681A, 681B are also both in the OFF status (0, 0) when the first light beam 61 enters into the polarizing light splitting element 62 in the first time sequence, then an image can be formed at the image position 3 and the image position 16 respectively.

Next, with continued reference to FIGS. 8 and 9 together, as can be clearly seen from FIG. 9, the first light beam 61A and the second light beam 61B of the light source module are provided to the projection apparatus 6 alternately and non-simultaneously. Taking the time period $t_0$ to $t_4$ as an example, the light source module provides the first light beam 61A. During a time interval from $t_0$ to $t_2$, the first transmissive light valve unit 67A and the second transmissive light valve unit 67B are in the ON status. However, the third transmissive light valve unit 68A and the fourth transmissive light valve unit 68B are in the ON status during a time interval from $t_0$ to $t_1$ and a time interval from $t_2$ to $t_3$ and are in the OFF status during a time period from $t_1$ to $t_2$. In other words, the switching period of the third transmissive light valve unit 68A and the fourth transmissive light valve unit 68B is half of a switching period of the first transmissive light valve unit 67A and the second transmissive light valve unit 67B (i.e., a multiple relationship exists therebetween). Similarly, when the light source module provides the second light beam 61B, the switching period of the third transmissive light valve unit 68A and the fourth transmissive light valve unit 68B is a half of the switching period of the first transmissive light valve unit 67A and the second transmissive light valve unit 67B. With the aforesaid arrangement, the projection apparatus 6 can generate sixteen viewing angle images in different time sequences.

Figure 10:
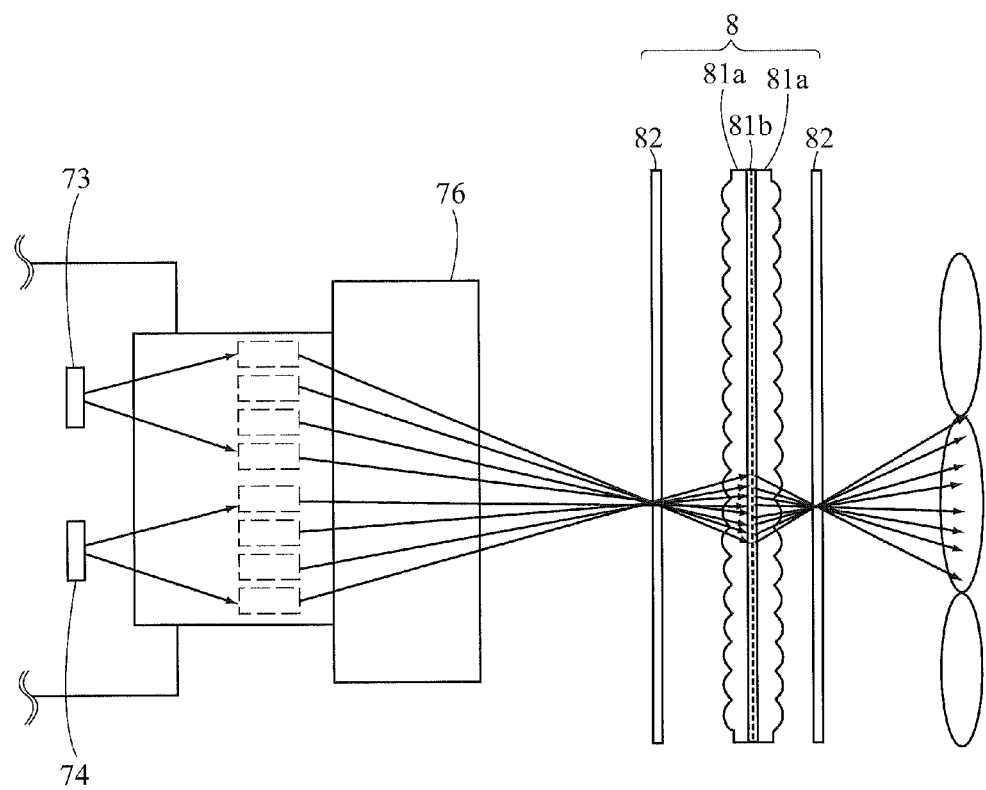
FIG. 10 is a schematic view illustrating use of the projection apparatus of the present invention in combination with a display screen.

Next, FIG. 10 illustrates a schematic view of the use of the projection apparatus of the present invention in combination with a display screen. It shall be appreciated that only a part of the projection apparatus is illustrated, and positions of the first reflective light valve 73 and the second reflective light valve 74 inside the projection apparatus are shown only for purpose of illustration but not to limit the actual arrangement. For convenience of understanding, the projection apparatus and the display screen 8 are exaggerated deliberately. In practical application, the display device 8 may be used with the projection apparatus of the third embodiment or other embodiments of the present invention. Furthermore, the projection apparatus may also be a rear-projection projector.

The display screen 8 comprises a double lenticular lens, which has two lenticular lens sheets 81a and an all-direction diffuser 81b disposed between the two lenticular lens sheets 81a. An outer plate 82 is disposed on the outer side of each of the two lenticular lens sheets 81a.

In detail, the first reflective light valve 73 and the second reflective light valve 74 are adapted to project sixteen viewing angle images into the projection lens 76. Then, with the all-direction diffuser 81b having the all-direction diffusion function, the sixteen viewing angle images from the projection apparatus can be projected to a reference plane.

Figure 11:
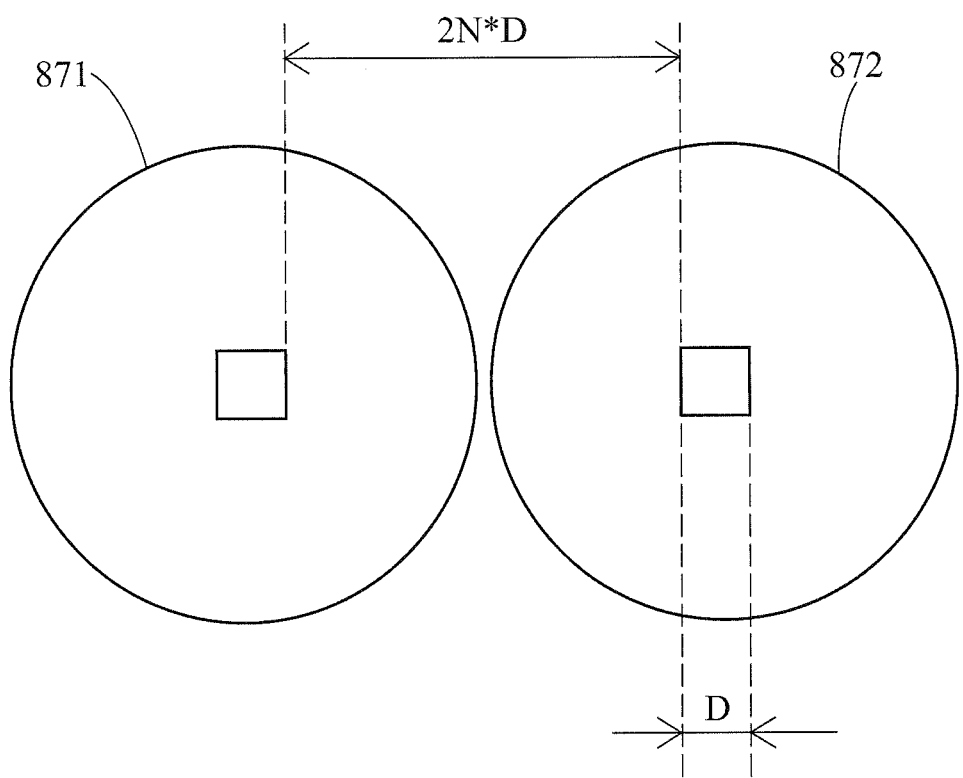
FIG. 11 is a schematic view illustrating the relative relationships between apertures and exit pupils of the projection lenses.
Figure 12:
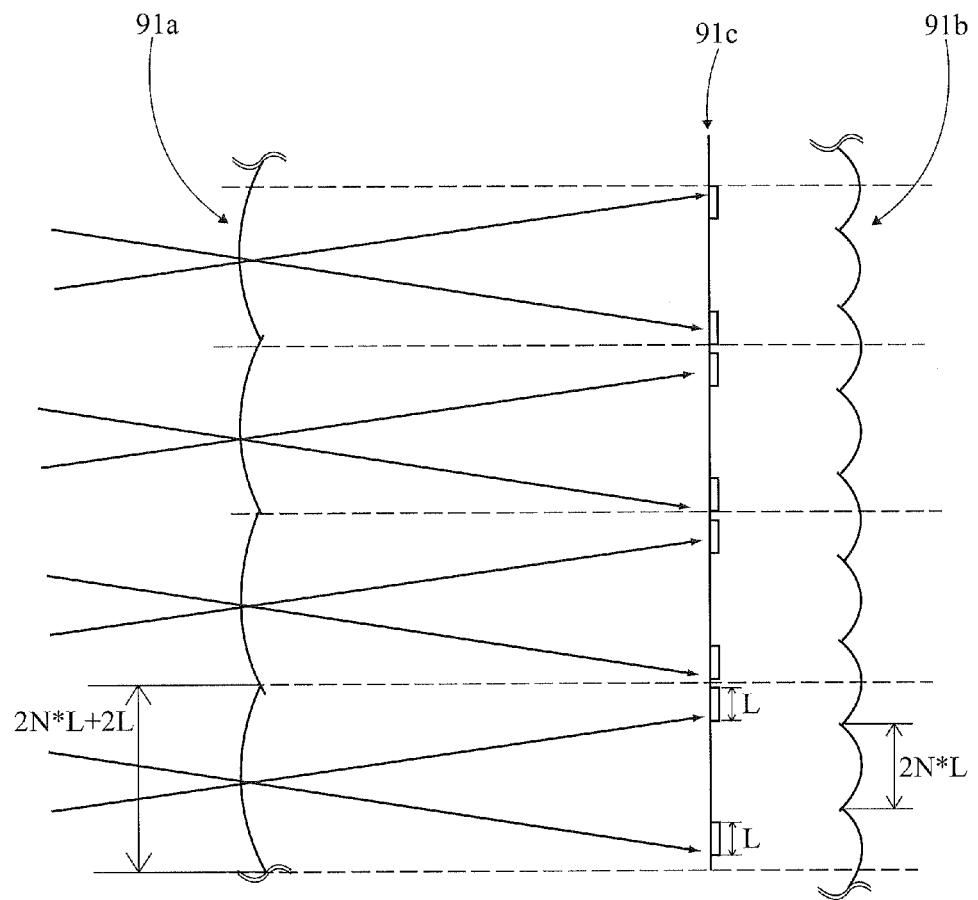
FIG. 12 is a partially enlarged view of a display screen used with two projection lenses.

Finally, with reference to FIGS. 11 and 12, FIG. 11 is a schematic view illustrating the relative relationships between the apertures and exit pupils of the projection lenses; and FIG. 12 is a partially enlarged view of a display screen used with the two projection lenses. Two lenticular lens sheets of the display screen 9 comprise a light entering surface 91a and a light emerging surface 91b. The first and the second projection lenses 871, 872 respectively have an exit pupil for forming an image on an all-direction diffuser 91c. The pitch-length of the light entering surface 91a is two image-lengths larger than the pitch-length of the light emerging surface 91b. In detail, the exit pupil of each of the first projection lens 871 and the second projection lens 872 that are adjacent to each other is defined as D, and a pupil distance is defined as 2N*D. Then, if each of the exit pupils D forms an image L on the all-direction diffuser 91c, then the light emerging surface 91b of the display screen 9 used with the two projection lenses must have a pitch of 2N*L, and the light entering surface 91a of the display screen 9 has a pitch of (2N*L+2L).

According to the above descriptions, in the projection apparatus of the present invention, a light source module capable of providing different light beams in different time sequences is used in combination with a polarizing light splitting element adapted to split each of the light beams from the light source module into light beams with different polarized directions, and the light beams with different polarized directions are transferred to a first reflective light valve and a second reflective light valve respectively to finally form the light beams into the first viewing angle image and second viewing angle image. On the basis of this basic architecture, at least two transmissive light valve units may further be provided to multiply the view angle images formed. Thereby, the user can receive different viewing angle images in different time sequences to obtain a stereoscopic image without the need of using any additional auxiliary device (e.g., a pair of glasses). With the aforesaid arrangement and application, a projection apparatus that features a high light utilization factor, a low cost, a simplified optical arrangement, high resolution and eliminates the need of a mechanical rotary member can be provided.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A projection apparatus for providing multiple viewing angle images, comprising:
    a light source module for sequentially providing a first light beam and a second light beam having a light path different from that of the first light beam;
    a polarizing light splitting element, having a light incident surface, a first light exiting surface and a second light exiting surface, the light incident surface optically coupling with the light source module, the polarizing light splitting element being used to split the first light beam into a first polarized light beam and a second polarized light beam and to split the second light beam into a third polarized light beam and a fourth polarized light beam, the first polarized light beam and the third polarized light beams being in a first polarized direction, and the second polarized light beam and the fourth polarized light beams being in a second polarized direction;
    a first reflective light valve, being optically coupled with the first light exiting surface to reflect the first and the third polarized light beams;
    a second reflective light valve, being optically coupled with the second light exiting surface to reflect the second and the fourth polarized light beams; and
    a light combining element, being optically coupled with the first and the second reflective light valves to reflect at least a portion of the first and the third polarized light beams that are reflected by the first reflective light valve, and to allow at least a portion of the second and the fourth polarized light beams that are reflected by the second reflective light valve to transmit therethrough;
    wherein, the projection apparatus further comprise:
    a first transmissive light valve unit and a second transmissive light valve unit, the first transmissive light valve unit being disposed between the first light exiting surface of the polarizing light splitting element and the first reflective light valve, and the second transmissive light valve unit being disposed between the second light exiting surface of the polarizing light splitting element and the second reflective light valve;
    wherein the first transmissive light valve unit converts at least a portion of the first or the third polarized light beam into the first or the third polarized light beam in the second polarized direction, the second transmissive light valve unit converts at least a portion of the second or the fourth polarized light beam into the second or the fourth polarized light beam in the first polarized direction, and the light combining element is a polarizing light combining element.

2. The projection apparatus as claimed in claim 1, wherein the light source module comprises:
    two laser light sources for providing a light beam respectively;
    a color wheel module, having a rotary wheel that is rotatable, the two laser light sources being disposed at a first side of the rotary wheel, the rotary wheel having at least one waveband converting region, a transmissive region and a reflective region, the at least one waveband converting region and the transmissive region together and the reflective region respectively rotatably corresponding to the two laser light sources, the at least one waveband converting region being used to convert a waveband of the light beams, the transmissive region being used to allow the light beams to pass therethrough, and the reflective region being used to reflect the light beams;
    a light coupling element, being disposed at the first side of the rotary wheel, for optically coupling the light beams that are reflected by the reflective region to the transmissive region or the at least one waveband converting region; and
    a light homogenizing element, being disposed at a second side that is opposite to the first side of the rotary wheel;
    wherein, after passing through the transmissive region or the at least one waveband converting region, the light beams enter the second side of the rotary wheel, and are received and homogenized by the light homogenizing element to form the first light beam or the second light beam.

3. The projection apparatus as claimed in claim 2, wherein the light coupling element are two reflectors, each of which has a reflective surface, and the two reflective surfaces form an included angle therebetween.

4. The projection apparatus as claimed in claim 2, wherein the light coupling element is a reflective prism with at least two reflective surfaces, and two of the at least two reflective surfaces form an included angle therebetween.

5. The projection apparatus as claimed in claim 1, wherein the light combining element is a total internal reflection cube.

6. The projection apparatus as claimed in claim 1, wherein the light combining element is a polarizing beam splitter.

7. The projection apparatus as claimed in claim 1, wherein each of the first and the second transmissive light valve units comprises a first transmission valve and a first half-wave plate being disposed at a side of the first transmission valve.

8. The projection apparatus as claimed in claim 7, wherein the first half-wave plate is disposed on a surface of the first transmission valve, and an area of the surface of the first transmission valve is twice as large as that of a surface of the first half-wave plate.

9. The projection apparatus as claimed in claim 1, wherein each of the first and the second transmissive light valve units comprises four first transmission valves which are disposed adjacent to one another.

10. The projection apparatus as claimed in claim 9, wherein each of the first and the second transmissive light valve units further comprises two half-wave plates, which respectively are disposed at a side of two of the four first transmission valves.

11. The projection apparatus as claimed in claim 1, further comprising a projection lens, which optically couples with a first light exiting surface of the light combining element.

12. The projection apparatus as claimed in claim 11, further comprising a display screen, wherein the display screen comprises a double lenticular lens which has two lenticular lens sheets and an all-direction diffuser disposed between the two lenticular lens sheets.

13. The projection apparatus as claimed in claim 1, wherein the first and the second transmissive light valve units are liquid crystal displays, π-cells, Ferro-electric liquid crystals, Pockels cells, Kerr shutters or Faraday crystals.

14. The projection apparatus as claimed in claim 1, further comprising a third transmissive light valve unit and a fourth transmissive light valve unit, which respectively optically couple with the first light exiting surface and a second light exiting surface of the light combining element.

15. The projection apparatus as claimed in claim 14, wherein each of the third and the fourth transmissive light valve units comprises a second transmission valve and a filtering plate which is disposed at a side of the second transmission valve.

16. The projection apparatus as claimed in claim 14, further comprising a first projection lens and a second projection lens, which respectively optically couple with the third and the fourth transmissive light valve units.

17. The projection apparatus as claimed in claim 16, further comprising a display screen, wherein the first and the second projection lenses are disposed adjacent to each other, and the display screen comprises a double lenticular lens having two lenticular lens sheets and an all-direction diffuser disposed between the two lenticular lens sheets.

18. The projection apparatus as claimed in claim 17, wherein one of the double lenticular lens sheet has a light entering surface and the other one has a light emerging surface, each of the first and the second projection lenses has an exit pupil for forming an image on the all-direction diffuser, and a pitch-length of the light entering surface equals to two lengths of the image of the exit pupil plus a pitch-length of the light emerging surface.

19. The projection apparatus as claimed in claim 14, wherein the third and the fourth transmissive light valve units are liquid crystal displays, π-cells, Ferro-electric liquid crystals, Pockels cells, Kerr shutters or Faraday crystals.

20. The projection apparatus as claimed in claim 1, wherein the first and the second reflective light valves are digital micro-mirror devices or silicon-based liquid crystal devices.

21. A projection apparatus for providing multiple viewing angle images, comprising:
a light source module for sequentially providing a first light beam and a second light beam having a light path different from that of the first light beam;
a polarizing light splitting element, having a light incident surface, a first light exiting surface and a second light exiting surface, the light incident surface optically coupling with the light source module, the polarizing light splitting element being used to split the first light beam into a first polarized light beam and a second polarized light beam and to split the second light beam into a third polarized light beam and a fourth polarized light beam, the first polarized light beam and the third polarized light beams being in a first polarized direction, and the second polarized light beam and the fourth polarized light beams being in a second polarized direction;
a first reflective light valve, being optically coupled with the first light exiting surface to reflect the first and the third polarized light beams;
a second reflective light valve, being optically coupled with the second light exiting surface to reflect the second and the fourth polarized light beams; and
a light combining element, being optically coupled with the first and the second reflective light valves to reflect at least a portion of the first and the third polarized light beams that are reflected by the first reflective light valve, and to allow at least a portion of the second and the fourth polarized light beams that are reflected by the second reflective light valve to transmit therethrough;
wherein, the light source module further comprises:
two laser light sources for providing a light beam respectively;
a color wheel module, having a rotary wheel that is rotatable, the two laser light sources being disposed at a first side of the rotary wheel, the rotary wheel having at least one waveband converting region, a transmissive region and a reflective region, the at least one waveband converting region and the transmissive region together and the reflective region respectively rotatably corresponding to the two laser light sources, the at least one waveband converting region being used to convert a waveband of the light beams, the transmissive region being used to allow the light beams to pass therethrough, and the reflective region being used to reflect the light beams;
a light coupling element, being disposed at the first side of the rotary wheel, for optically coupling the light beams that are reflected by the reflective region to the transmissive region or the at least one waveband converting region; and
a light homogenizing element, being disposed at a second side that is opposite to the first side of the rotary wheel;
wherein, after passing through the transmissive region or the at least one waveband converting region, the light beams enter the second side of the rotary wheel, and are received and homogenized by the light homogenizing element to form the first light beam or the second light beam.

22. The projection apparatus as claimed in claim 21, wherein the light coupling element are two reflectors, each of which has a reflective surface, and the two reflective surfaces form an included angle therebetween.

23. The projection apparatus as claimed in claim 21, wherein the light coupling element is a reflective prism with at least two reflective surfaces, and two of the at least two reflective surfaces form an included angle therebetween.

24. The projection apparatus as claimed in claim 21, wherein the light combining element is a total internal reflection cube.

* * * * *